United States Patent Office 3,275,508
Patented Sept. 27, 1966

3,275,508
METHOD FOR TREATMENT OF TOXOPLASMOSIS IN ANIMALS
Kiyoshi Tsunoda, Kodaira-shi, and Noriyuki Okuda, Tokyo-to, Japan, assignors to Daiichi Seiyaku Kabushiki Kaisha, Tokyo-to, Japan, a joint-stock company of Japan
No Drawing. Filed July 6, 1964, Ser. No. 380,634
Claims priority, application Japan, July 16, 1963, 38/38,578
8 Claims. (Cl. 167—53)

This invention relates to a method for the treatment of toxoplasmosis in animals with 4-methoxy-6-sulfanilamidopyrimidine or its derivatives represented by the following formula:

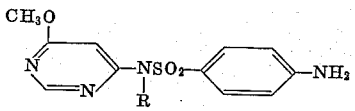

wherein R is a hydrogen atom, alkali metal, or alkaline earth metal.

Toxoplasma which belongs to the Infectious Protozoa can be widely parasitic on dogs, cats, swine, cattle, sheep, rodents, birds, and men, bringing acute or chronic infections to the hosts. Acute infection often causes death of the host in approximately ten days, while chronic infection is highly contagious, and causes great misery to the infected. Therefore, with the progress of fundamental study being achieved on animal toxoplasmosis, increasing public attention has been paid to this parasitic infection.

Although a few medicines have so far been tried for the treatment of animal toxoplasmosis, none has ever proved satisfactory.

The present invention has for its object the provision of a method for the treatment of toxoplasmosis in domestic or farm animals such as cattle, dogs, cats, swine, cows, sheep, horses, and birds.

We have conducted tests of numerous chemicals for efficacy with respect to animal toxoplasmosis and, as a result, have found that 4-methoxy-6-sulfanilamidopyrimidine and its derivatives can exert extraordinarily good therapeutic effect as compared with other ordinary medicines.

The compound, 4-methoxy-6-sulfanilamidopyrimidine which is used in the present invention has been synthesized for the first time by one of us, and for which a patent application has already been filed (U.S. Patent Application Serial No. 132,591 (1961)). 4-methoxy-6-sulfanilamidopyrimidine recrystallized from methanol is in the form of colorless needless of M.P. 200–201° C. (uncorrected). An alkali salt of this compound is obtained by neutralizing 4-methoxy-6-sulfanilamidopyrimidine with caustic alkali, while an alkaline earth metal salt of this compound is readily obtained by treating the alkali metal salt thereof with an equivalent amount of alkaline earth metal chloride. 6-($N^1$-acetylsulfanilamido)-4-methoxypyrimidine which is also used in the present invention is produced by acetylating 6-(p-nitrobenzenesulfonamido)-4-methoxypyrimidine or its alkali metal salt to produce 6-($N^1$-acetyl-p-nitrobenzenesulfanilamido)-4-methoxypyrimidine, and then by reducing the latter.

The outstanding effects of 4-methoxy-6-sulfanilamidopyrimidine and its derivatives upon toxoplasmosis were confirmed by tests conducted on mice. Unlike other animals, the mouse is said to be slow in the production of antibodies following infection with toxoplasma, the production reaching the maximum (according to Sabin and Feldman's dye test) after more than 30 days subsequent to the infection. Thus, mice once infected with a toxic strain such as RH strain will present symptoms of toxoplasmosis and die without exception within a certain period of days. Therefore, the efficacy of the compounds of the present invention can be determined very conveniently by observing how long the survival time of mice can be prolonged by administration of said chemicals. It may be pointed out in this connection that, if a mouse dosed with a certain chemical for a period of from 6 to 14 days can survive for two weeks, the chemical is generally deemed effective, while, if it can survive for three weeks with the same total dosage, the chemical is regarded as being highly efficacious. From experiences with other drugs, it is apparent to us that the chemicals efficacious for mice are all the more valuable to other animals which can more readily produce antibodies.

A large number of chemicals tested heretofore are ineffective, and even if they are effective and permit a limited number of mice to survive for a long period of time, a small number of the protozoa remain alive in the bodies of the mice, often in the form of cysts. On the other hand, the infected mice administered with 4-methoxy-6-sulfanilamidopyrimidine survived for 51 days and were considered to be protozoa-free because, when the homogenized brains of these mice were subjected to blind passage tests over two generations, the inoculated mice showed no symptoms of toxoplasmosis.

Recently, serious consideration has been given to the possibility of placental infection of toxoplasmosis, but there is no record of treatment with ordinary drugs for this type of infection. Experimental treatment of pregnant mice with the compounds of the present invention, however, gave the same results as those in treatment of non-pregnant mice. All of the mice which survived had normal parturitions and nursed normal litters of young. These young were observed for 60 days, and none was found to be infected. The unmedicated controls were invariably infected on the 5th day, and died on the 6th to 7th day.

For the test, a toxic strain separated from ascites of infected mice was used, and a suspension in saline was prepared in such a manner that a certain number of toxoplasma organisms were contained therein. A certain quantity ($8.7 \times 10^4$–$1.0 \times 10^4$) of the suspension was injected into the abdominal cavities of the test mice. The mice tested, both male and female, weighed from 17 to 19 g. Most of the pregnant mice used were from 20 to 22 g. in weight. The compounds were administered for seven consecutive days after the date of the infection. The compounds were mixed in with the diet, in five different percentages of 0.24, 0.12, 0.06, 0.03, and 0.015. As the diet, the formula feed for the mice was given in an amount of 4 g. per mouse per day. Drinking water was given freely by means of an automatic water supplier.

The efficacy of the drugs according to the present invention was determined on the basis of the difference between the medicated mice and controls in the fatality and prolongation of the survival time which were observed daily throughout the whole testing period. The surviving mice were killed on the 51st day after the infection, and each 0.4 cc. portion of their homogenized brain was injected into the abdominal cavities of six mice, and the mice so injected were further observed for 30 days. If the mice were not infected during this period, they were killed, and again their homogenized brain was inoculated into another group of six mice (i.e. second generation), and observation was continued for another period of 30 days. In the case when the mice were not infected during the period, those which survived after the first medication were considered to have been completely cured, with extinction of toxoplasma. None of the test mice dosed with the drugs of the present invention was infected. For experiments with pregnant mice, those whose abdomens were evidently swollen, although the dates of fertilization were not known, were collected. In the experiments, the young born by normal parturitions were observed for 60 days after birth, to observe whether or not they were congenitally infected. All exhibited negative results.

Toxoplasmosis in swine must be cured with especially exact efficacy because of the high fatality of swine due to the infection and also because the cysts in the infected meat pose a public health problem.

Experimental treatment of toxoplasma-infected swine with 4-methoxy-6-sulfanilamidopyrimidine was conducted according to the following procedure.

caustic soda, the pH value of the resulting solution being adjusted to 9.0–11. Practically, a daily dose of from 20 mg. to 100 mg./kg. is given by injection or in mixture with feedstuffs. In the latter case, the compound is mixed beforehand with a solid or liquid carrier or carriers which do not affect the characteristics of the compound and are non-toxic to the animals, e.g. sodium bicarbonate, lactose, dextrose, sucrose, starch, talc, calcium carbide, and shell powder, for the sake of convenience in administration or to increase stability of the chemical, or the compound is directly mixed with feedstuffs such as wheat bran, rice bran, or soybean cake.

The drug may also be used in the form of a syrup, in which case less bitter 4-($N^1$-acetylsulfanilamide)-6-methoxypyrimidine is used as the principal constituent in admixture with a non-toxic pharmaceutical carrier.

In order to indicate still more fully the nature of the present invention, the invention is described hereinbelow with respect to the following examples which are intended to be illustrative but in no way restrictive.

*Example 1*

Groups each of five mice weighing from 17 to 19 g. each were infected with $8.7 \times 10^4$ toxoplasma (RH strain) per mouse. For 7 days from the date of the infection, inclusive, 4-methoxy-6-sulfanilamidopyrimidine was given to the test animals in thorough mixture with feed in such amounts that the percentages of the compound in the diet were 0.24, 0.12, 0.06, 0.03, and 0.015. The results were as is shown in Table 1.

TABLE 1.—EXPERIMENTAL TREATMENT OF MICE

| Group No. | Dosage (Percent) | Days after infection ||||||| No. of mice survived 50 days | Survival rate (Percent) |
| | | 6 | 7 | 15 | 19 | 21 | 24 | 25 | 27 | | |
| | | No. of dead mice in each group |||||||| | |
| 1 | 0.24 | | | | | 1 | 2 | | | 2 | 40 |
| 2 | 0.12 | | | | | | 1 | 2 | | 2 | 40 |
| 3 | 0.06 | | | | | 1 | | | | 4 | 80 |
| 4 | 0.03 | | | | | 1 | | | 2 | 2 | 40 |
| 5 | 0.015 | | | 5 | | | | | | 0 | 0 |
| 6 | 0 | 2 | 3 | | | | | | | 0 | 0 |

Test swine about 40 days after birth were infected with toxoplasma which was isolated from naturally-infected swine. The swine were dosed with 4-methoxy-6-sulfanilamidopyrimidine by intramuscular injection immediately after the infection and after development of the symptoms. According to a subsequent dye test, the test animals were in a state of heavy infection with an increased titer, but it was ascertained, nevertheless, that toxoplasma and its cysts had disappeared in each animal. This indicates that, whereas the chemicals tried heretofore merely alleviate the condition of toxoplasmosis in animals, the compound of the present invention has a thorough remedial effect as it not only cures animal toxoplasmosis but causes complete extinction of toxoplasma. One of unmedicated controls died in 10 days after it exhibited symptoms of the infection, while another control showed severe symptoms and thereafter recovered. In either case, however, the existence of toxoplasma was confirmed in almost all internal organs of these test animals.

In the treatment according to the present invention, 4-methoxy-6-sulfanilamidopyrimidine may be administered to animals infected with toxoplasma, either orally or otherwise. For example, the compound may be given by intravenous, intramuscular, or hypodermic injection, or by mixing it into feedstuffs. For emaciated animals having little appetite, injection is preferred. For injection, the compound is diluted with a sterilized liquid, for example, a sterilized solvent such as water. Preferably the compound is dissolved in an aqueous solution of As will be seen from the above table, all of the mice of the infected but unmedicated group No. 6 presented symtoms of toxoplasmosis in 5 days after the infection, and died on the 6th or 7th day. In the ascites of the dead mice, numerous toxoplasma organisms were observed.

The group No. 5 given a dosage of 0.015% presented symptoms of toxoplasmosis, and all died on the 14th or 15th day. The test mice of the 0.03% group (No. 4), 0.06% group (No. 3), 0.12% group (No. 2), and 0.24% (No. 1) group all survived for 18 days, with sporadic deaths on the 19th day and thereafter. These deaths were due to recurrence of the disease following discontinuation of medication after the first week. The number of dead mice was recorded during the period from the 19th to 27th day after the infection. The mice which survived the fatal period were all sound and vigorous, and toxoplasma in the ascites of these animals were far less in number than those in the control group.

The mice which survived for 50 days were killed and dissected on the 51th day, and homogenized brain was obtained from each group. Then, groups of 6 mice were inoculated abdominally with 0.4 cc. of the homogenized brain per mouse and were observed for 30 days for symptoms of toxoplasmosis and for emergence of toxoplasma. The results were entirely negative in all of the groups observed. Next, the mice subjected to the above last experiment were killed and dissected, and homogenized brain was prepared in each group. Groups of 6 mice were inoculated abdominally with 0.4 cc. of the homogenized brain per mouse, and observed for 30 days for symptoms of toxoplasmosis and for emergence of toxoplasma. The results of the subinoculation over two generations, as shown in Table 2, showed no case of toxoplasmosis in any of the groups, with no emergence of toxoplasma observed.

TABLE 2.—EXAMINATION FOR TOXOPLASMA IN MICE INOCULATED WITH HOMOGENIZED BRAIN OF MICE WHICH SURVIVED UPON TREATMENT WITH THE COMPOUND OF THE PRESENT INVENTION

| Dosage (Percentage in feed) | Mice survived | No. of mice inoculated with homogenized brain | No. of mice which presented symptoms 30 days later | No. of mice inoculated again with homogenized brain | No. of mice which presented symptoms 30 days later |
|---|---|---|---|---|---|
| No. 1 ((0.24%) | 2 | 6 | 0 | 6 | 0 |
| No. 2 (0.12%) | 2 | 6 | 0 | 6 | 0 |
| No. 3 (0.06%) | 4 | 6 | 0 | 6 | 0 |
| No. 4 (0.03%) | 2 | 6 | 0 | 6 | 0 |

From the above results, it is considered that, in this example, toxoplasma in the mice which survived after infection for more than 27 days had become extinct.

Example 2

Of the mice raised, those which were apparently pregnant were collected, and were inoculated with $1.0 \times 10^4$ toxoplasma per mice. Then, groups of 5 mice were medicated for 7 consecutive days from the day of infection, inclusive, with 4 - methoxy - 6-sulfanilamidopyrimidine thoroughly mixed in feed in such amounts that the percentages of the compound in the feed for five different groups were, respectively, 0.24% (for the group No. 1), 0.12% (No. 2), 0.06% (No. 3), 0.03% (No. 4), and 0.% (No. 5). The results were as is shown in Table 3.

TABLE 3.—EXPERIMENTAL TREATMENT OF PREGNANT MICE

| Group No. | Dosage (percent) | Days after infection | | | | | | No. of mice survived 50 days | Survival rate (percent) | Rate of normal parturition |
|---|---|---|---|---|---|---|---|---|---|---|
| | | 5 | 6 | 7 | 18 | 21 | 24 | 28 | | |
| | | No. of dead mice in each group | | | | | | | | |
| 1 | 0.24 | | | | | 2 | 1 | | 2 | 40 | 100 |
| 2 | 0.12 | | | | | | 2 | | 3 | 60 | 100 |
| 3 | 0.06 | | | | | | 1 | | 4 | 80 | 80 |
| 4 | 0.03 | | | | 2 | | | 1 | 2 | 40 | 80 |
| 5 | 0 | 1 | 3 | 1 | | | | | 0 | 0 | 0 |

When the mice delivered of their young died of toxoplasmosis, the young also died because of their inability to suckle. However, the young of the mother mice which survived grew normally. Observation was continued for 60 days after birth of 14 young mice, that is, 8 and 6 born, respectively, by the two surviving mice of the group No. 1; of 14 young mice, that is, 4, 5, and 5 born by the 3 surviving mice of the group No. 2; of 25 young mice, that is, 3, 6, 6, and 10 mice born by the 4 surviving mice of the group No. 3; and of 12 young mice, that is, 4 and 8 born by the 2 surviving mice of the group No. 4. All grew soundly with no symptom of toxoplasmosis.

Example 3

3 groups of 2 swine about 40 days after birth were infected, by abdominal inoculation, with $20.5 \times 10^6$ toxoplasma (HG strain) per swine. Then, 4-methoxy-6-sulfanilamidopyrimidine was administered to the infected animals. The method, dosage, and duration of the medication were as is shown in Table 4.

TABLE 4.—METHOD, DOSAGE, AND DURATION OF MEDICATION

| Swine No. | Method of medication | Dosage | Period of medication |
|---|---|---|---|
| 1 and 2 | | | Infected, unmedicated control. |
| 3 and 4 | Intramuscular injection | 60 mg./kg. ea | Medicated for 7 days after initial symptoms. |
| 5 and 6 | do | 60 mg./kg. ea | Medicated for 7 days from the time of infection. |

The effects were estimated by the degrees and extents of clinical symptoms, conditions of recovery, results of autopsy, and extinction of toxoplasma.

All of the swine inoculated with toxoplasma were attacked by fever of from 40 to 41° C. on the 3rd day of the infection. Then medication for the swine No. 3 and No. 4 was begun on the 4th day of the infection. The two test animals recovered on the 5th day of the medication. The swine No. 5 and No. 6 which were medicated immediately upon infection showed no symptoms of the disease. Of the test swine, one dead swine was dissected immediately after death, and the 7 surviving swine were killed and dissected on the 74th day after the infection. The internal organs of all of the test swine were homogenized. The homogenized organs were subjected to blind passage test, and the existence of toxoplasma and its cysts were examined. Mice which were inoculated with homogenized organs and did not exhibit symptoms of toxoplasmosis were examined to determine whether or not they were infected with toxoplasma. Further, the test pigs were subjected to dye test and examined for the degree of the increase of the titer. The results are shown in Table 5. No trace of toxoplasma or its cysts was found in the bodies of the swine inoculated with toxoplasma and treated with the chemical.

TABLE 5.—EXISTENCE OF TOXOPLASMA ORGANISMS IN THE INTERNAL ORGANS OF INFECTED SWINE CONFIRMED BY INOCULATION INTO MICE

| Pig No. | Internal Organs of Swine | | | | | | | | | | Seroreaction | |
|---|---|---|---|---|---|---|---|---|---|---|---|---|
| | Brain | Diaphragm | Liver | Kidney | Spleen | Lungs | Pancreas | Lymph-glandula | Myocardium | Muscles | Dye test titer of Swine | Dye test titer of inoculated mice |
| 1 | + | + | − (−) | + | + | − (−) | − | ± −⅜ | + | + | x 4096> | Δ |
| 2 | + | + | + | + | + | + | (−) | + | + | + | x 1024 | Δ |
| 3 | − (−) | − (−) | − (−) | − (−) | − (−) | − (−) | − (−) | − (−) | − (−) | − (−) | x 1024 | x 4< |
| 4 | − (−) | − (−) | − (−) | − (−) | − (−) | − (−) | − (−) | − (−) | − (−) | − (−) | x 4096> | x 4< |
| 5 | − (−) | − (−) | − (−) | − (−) | − (−) | − (−) | − (−) | − (−) | − (−) | − (−) | x 256 | 0 |
| 6 | − (−) | − (−) | − (−) | − (−) | − (−) | − (−) | − (−) | − (−) | − (−) | − (−) | x 256 | 0 |

Note: +=Toxoplasma demonstrated directly by mice.
±=Toxoplasma-positive mice/inoculated mice.
−=Toxoplasma-negative.

Δ=Not determined, because of toxoplasma demonstration.
( )=Direct examination of cysts in mouse brain.

Meanwhile, in the unmedicated control group, the swine No. 2 died on the 13th day, and existence of toxoplasma was confirmed in all of the internal organs examined, while the swine No. 3 survived the infection and substantially regained its health but demonstrated existence of numerous toxoplasma in its internal organs excepting the liver, the lungs, and the pancreas.

We claim:

1. A method for the treatment of toxoplasmosis in animals which comprises dosing an infected animal with at least one of the compounds of the formula:

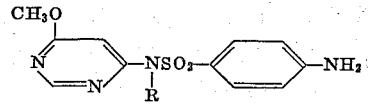

wherein R is a member selected from the group consisting of hydrogen, alkali metal, and alkaline earth metal.

2. A method for the treatment of toxoplasmosis in animals which comprises dosing an infected animal with the compound 4-methoxy-6-sulfanilamidopyrimidine of the formula:

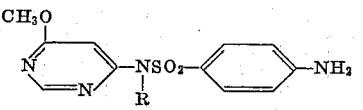

wherein R is a member selected from the group consisting of hydrogen, alkali metal, and alkaline earth metal, said compound being administered in combination with a nutrient feed.

3. A method according to claim 2, wherein said compound is administered in a dosage of from 20 mg./kg. to 100 mg./kg. (dosage weight per kg. of animal body weight) a day in combination with a nutrient feed.

4. A method for the treatment of toxoplasmosis in animals which comprises injecting an infected animal with at least one of the compounds of the formula:

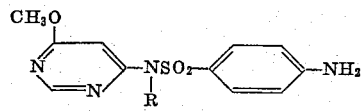

wherein R is a member selected from the group consisting of hydrogen, alkali metal, and alkaline earth metal, said compound being dissolved in a sterilized diluent.

5. A method according to claim 4, wherein said compound is administered in a dosage of from 20 mg./kg. to 100 mg./kg. (dosage weight per kg. of animal body weight) a day.

6. A method for the treatment of toxoplasmosis in animals which comprises injecting an infected animal with at least one of the compounds of the formula:

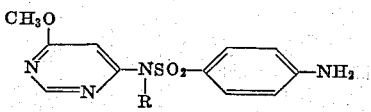

wherein R is a member selected from the group consisting of hydrogen, alkali metal, and alkaline earth metal, said compound being dissolved in an aqueous solution of caustic soda, the pH of which solution is adjusted to 9.0–11.0, and being administered in a dosage of from 20 mg./kg. to 100 mg./kg. (dosage weight per kg. of animal body weight) a day in terms of the principal component.

7. A method according to claim 4, wherein the injection is given intramuscularly.

8. A method for the treatment of toxoplasmosis in animals which comprises administering to an infected animal a syrup made of 4-(N$^1$-acetylsulfanilamido)-6-methoxypyrimidine of the formula:

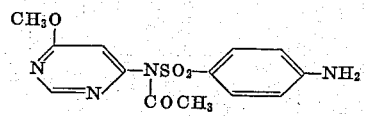

and a non-toxic pharmaceutical carrier, in a dosage of from 20 mg./kg. to 100 mg./kg. (dosage weight per kg. of animal body weight) a day in terms of the principal component.

References Cited by the Examiner

FOREIGN PATENTS 588,169  9/1960  Belgium.
588,170  9/1960  Belgium.

OTHER REFERENCES

Smellingrebel, Animal Parasites in Man, 1961, D. Van Nostrand Co., Inc. (p. 137 relied on).

JULIAN S. LEVITT, *Primary Examiner.*

NORRIS G. MANN, STANLEY J. FRIEDMAN,
*Assistant Examiners.*